United States Patent
Tang et al.

(10) Patent No.: US 12,172,683 B2
(45) Date of Patent: Dec. 24, 2024

(54) SYSTEM FOR CONTROLLING MULTI-POINT SYNCHRONOUS BRAKING OF MONORAIL HOIST AND UTILIZATION METHOD THEREOF

(71) Applicant: China University of Mining and Technology, Jiangsu (CN)

(72) Inventors: Yu Tang, Jiangsu (CN); Zhencai Zhu, Jiangsu (CN); Gang Shen, Jiangsu (CN); Xiang Li, Jiangsu (CN); Mengmeng Gao, Jiangsu (CN); Wei Wang, Jiangsu (CN); Yuxing Peng, Jiangsu (CN); Gongbo Zhou, Jiangsu (CN); Hao Lu, Jiangsu (CN); Qingguo Wang, Jiangsu (CN)

(73) Assignee: China University of Mining and Technology, Jiangsu (CN)

( * ) Notice: Subject to any disclaimer, the term of this patent is extended or adjusted under 35 U.S.C. 154(b) by 0 days.

(21) Appl. No.: 18/272,805

(22) PCT Filed: Sep. 19, 2022

(86) PCT No.: PCT/CN2022/119563
§ 371 (c)(1),
(2) Date: Jul. 18, 2023

(87) PCT Pub. No.: WO2023/206932
PCT Pub. Date: Nov. 2, 2023

(65) Prior Publication Data
US 2024/0391509 A1    Nov. 28, 2024

(30) Foreign Application Priority Data

Apr. 29, 2022 (CN) .......................... 202210473205.6

(51) Int. Cl.
*B61H 7/12* (2006.01)
*F16D 66/02* (2006.01)

(52) U.S. Cl.
CPC ............. *B61H 7/12* (2013.01); *F16D 66/022* (2013.01)

(58) Field of Classification Search
CPC .......... B61H 7/12; F16D 3/008; F16D 66/022
(Continued)

(56) References Cited

U.S. PATENT DOCUMENTS 8,453,802 B1 * 6/2013 Simpson ............... F16D 63/008
188/41

FOREIGN PATENT DOCUMENTS

| CN | 2173733 | 8/1994 |
| CN | 103072864 | 5/2013 |

(Continued)

OTHER PUBLICATIONS

English machined translation of CN—203048383 U, description only.*

(Continued)

*Primary Examiner* — Robert A. Siconolfi
*Assistant Examiner* — San M Aung
(74) *Attorney, Agent, or Firm* — JCIPRNET

(57) ABSTRACT

The disclosure discloses a system for controlling a multi-point synchronous braking of a monorail hoist and a utilization method thereof. The system comprises a contact detection unit, a common end roller unit, a hydraulic unit, a synchronous control unit and connection cables. The contact detection unit is installed on a brake shoe of a monorail hoist. The common end roller unit is installed on a travelling track and connected with a frame of the monorail hoist. The contact detection unit includes a tube in connection with the brake shoe. A metal probe corresponding to the travelling (Continued)

track is arranged inside the tube. A circular boss is formed on the metal probe. A limiting bolt corresponding to the circular boss is formed on an inner side wall of the tube. The metal probe is contactable with the travelling track or the limiting bolt when the brake shoe brakes.

10 Claims, 4 Drawing Sheets

(58) Field of Classification Search
USPC .......................................................... 188/41
See application file for complete search history.

(56) References Cited

FOREIGN PATENT DOCUMENTS

| | | | |
|---|---|---|---|
| CN | 203048383 | | 7/2013 |
| CN | 209263934 U | * | 8/2019 |
| CN | 113675017 | | 11/2021 |
| CN | 114688189 | | 7/2022 |
| CN | 219314394 U | * | 7/2023 |
| DE | 102015108277 A1 | * | 12/2016 ............... B60T 1/14 |
| GB | 1160196 | | 7/1969 |
| JP | 2000211890 | | 8/2000 |

OTHER PUBLICATIONS

"International Search Report (Form PCT/ISA/210) of PCT/CN2022/119563," mailed on Jan. 11, 2023, pp. 1-5.
"Written Opinion of the International Searching Authority (Form PCT/ISA/237) of PCT/CN2022/119563," mailed on Jan. 11, 2023, with English translation thereof, pp. 1-10.

* cited by examiner

SYSTEM FOR CONTROLLING MULTI-POINT SYNCHRONOUS BRAKING OF MONORAIL HOIST AND UTILIZATION METHOD THEREOF

CROSS-REFERENCE TO RELATED APPLICATION

This application is a 371 of international application of PCT application serial no. PCT/CN2022/119563, filed on Sep. 19, 2022, which claims the priority benefit of China application no. 202210473205.6, filed on Apr. 29, 2022. The entirety of each of the above mentioned patent applications is hereby incorporated by reference herein and made a part of this specification.

TECHNICAL FIELD

The present disclosure relates to the technical field of monorail hoists, specifically to a system for controlling a multi-point synchronous braking of a monorail hoist and a utilization method thereof.

RELATED ART

The monorail hoist is a multi-functional and high-efficiency auxiliary transportation equipment for modern coal mines, which can efficiently complete the hoisting and transportation of mine materials, underground equipment, operators and the like, and the braking system carries the task of safety protection. Whether the braking system can work stably and effectively is directly related to the safe operation of the monorail hoist, which has an important impact on the production of coal mines and even the safety of personnel.

At present, the monorail hoist transportation system commonly uses multiple driving parts to drive the hoist, each driving part includes at least one brake, each driving part is separated by a certain distance, and the distance between the front driving part and the rear driving part can reach up to tens of meters. When the monorail hoist brakes, due to the fact that the existing multiple sets of brakes are controlled by the same hydraulic component, after the control system issues a brake command, the factors such as different lengths of the hydraulic pipelines (the maximum difference can be tens of meters), differences in brake response characteristics, and different abrasion states of brake shoes in the system result in the asynchronous braking of multiple sets of brakes during the braking process, further lead to increased abrasions of some of brakes, thus causing the premature failure of the brakes and increasing the braking safety hazards. However, at present, there is still a lack of simple and effective synchronous control methods for multiple sets of brakes on monorail hoists in China and abroad. Therefore, it is significant to solve the problem of multi-point synchronous braking control of the monorail hoist for improving the braking safety of monorail hoists.

SUMMARY OF INVENTION

In view of the above-mentioned technical deficiencies, the objectives of the present disclosure are to provide a system for controlling a multi-point synchronous braking of a monorail hoist and a utilization method thereof, which can effectively solve the problem that the monorail hoist cannot implement the multi-point synchronous braking control.

In order to solve the above-mentioned technical problems, the technical solutions adopted in the present disclosure are as follows.

A system for controlling a multi-point synchronous braking of a monorail hoist is provided in the present disclosure. The system comprises a contact detection unit, a common end roller unit, a hydraulic unit, a synchronous control unit and connection cables. The contact detection unit is installed on a brake shoe of the monorail hoist, and the common end roller unit is installed on a travelling track and connected with a frame of the monorail hoist. The contact detection unit includes a tube in connection with the brake shoe. A metal probe corresponding to the travelling track is arranged inside the tube. A circular boss is formed on the metal probe. A limiting bolt corresponding to the circular boss is formed on an inner side wall of the tube. The metal probe is contactable with the travelling track or the limiting bolt when the brake shoe brakes. The brake shoe is connected with the hydraulic unit through a brake arm, and the metal probe, the limiting bolt, the hydraulic unit and the common end roller unit are electrically connected with the synchronous control unit through the connection cables.

Preferably, the synchronous control unit includes an idling time detection module, a synchronous control module and an abrasion pre-alarm module. The idling time detection module is connected with the metal probe and the common end roller unit through the connection cables. The abrasion pre-alarm module is connected with the limiting bolt through the connection cables, and the synchronous control module is electrically connected with the idling time detection module, the abrasion pre-alarm module and the hydraulic unit.

Preferably, the hydraulic unit includes a pressure reducing valve, a two-position three-way electromagnetic reversing valve and a brake cylinder. An oil inlet of the pressure reducing valve is connected with a high-pressure oil pipe of a hydraulic pump station. Two oil inlets of the two-position three-way electromagnetic reversing valve are respectively in communication with an oil outlet of the pressure reducing valve and an oil tank. An oil outlet of the two-position three-way electromagnetic reversing valve is in communication with a piston rod chamber of the brake cylinder, and a telescopic rod of the brake cylinder is connected with a brake arm.

Preferably, the two-position three-way electromagnetic reversing valve is replaceable by a two-position four-way electromagnetic reversing valve or a three-position four-way electromagnetic reversing valve.

Preferably, the contact detection unit further includes the metal probe, a base plate, a limiting ring, a guide ring I, a guide ring II and a preload spring. The tube is threadedly connected with the brake shoe. A bottom part of the tube is provided with a threaded hole. The guide ring I is fixed on a top of the tube. The limiting bolt is installed on an inner side of the tube. The limiting ring is installed on an inner wall of the tube, and the guide ring II is installed inside the limiting ring. The base plate is installed inside the threaded hole at a bottom of the tube. The base plate is provided with a circular through-hole. One end of the metal probe away from the limiting bolt is passed through the guide ring I and the guide ring II in sequence and is protruded outside the brake shoe to correspond to the travelling track, and another end of the metal probe approximate to the limiting bolt is sleeved with the preload spring. The preload spring is abutted against the base plate and the circular boss on the metal probe, and the circular boss of the metal probe is pressed against the limiting ring under an action of the preload spring.

Preferably, the tube and the limiting ring are made of nylon or polytetrafluoroethylene.

Preferably, a distance between a center line of the limiting bolt and an end face of the circular boss of the metal probe approximated to the limiting bolt ranges from 11 mm to 12 mm.

Preferably, a length of the metal probe protruding outside an end face of the brake shoe approximate to the travelling track range from 1 mm to 2 mm.

Preferably, the common end roller unit is made of a metal conductive material.

A method for utilizing the above system is further provided in the present disclosure. The method comprises the following steps.

(1) The system for controlling the multi-point synchronous braking of the monorail hoist is installed on the monorail hoist, and a braking test is performed when the monorail hoist operates for the first time.

(2) A time $t_{i0}$ when the two-position three-way electromagnetic reversing valve corresponding to the i-th brake shoe receives a braking command is recorded by the idling time detection module in the synchronous control unit. When the metal probe in the contact detection unit installed on the i-th brake shoe contacts the travelling track, a corresponding turn-on signal is detected by the idling time detection module and a time ti when the i-th brake signal is turned on is recorded by the idling time detection module. An idling time $\Delta t_i$ of the i-th brake shoe is calculated by the idling time detection module and sent to the synchronous control unit at the same time, the calculation formula is $\Delta t_i = t_i - t_{i0}$.

(3) When the idling time of the i-th brake shoe detected by the idling time detection module is $\Delta t \geq 700$ ms, an alarm is sent by the synchronous control unit to remind that the brake shoe is abnormal.

(4) When the abrasion pre-alarm module in the synchronous control unit detects a contact signal between the limiting bolt corresponding to the i-th brake shoe and the metal probe, an alarm is sent by the synchronous control unit to remind that an abrasion loss of the brake shoe is excessively large.

(5) After the synchronous control module in the synchronous control unit receives the idling time of all the brake shoes, the idling time of all brake shoes are compared to obtain the maximum value $t_{max}$ for the idling time.

(6) Action delay time $\Delta t_{idelay}$ when the i-th brake shoe (7) brakes for the subsequent time is calculated by the synchronous control module in the synchronous control unit, the calculation formula is $\Delta t_{idelay} = t_{max} - t_i$.

(7) When the monorail hoist requires to be braked again during the operation, a brake control command is sent to the two-position three-way electromagnetic reversing valve in the i-th brake shoe by the synchronous control module after delaying the time of $\Delta t_{idelay}$.

(8) Step (2) to Step (7) are repeated.

The beneficial effects of the present disclosure are as follows.

1. The present disclosure can solve the problem that multiple sets of brakes of the existing monorail hoist adopting the same hydraulic control element cannot control each brake independently, and is difficult to implement the consistency of the actions of multiple brakes. Each brake shoe provided in the present disclosure adopts a separate electromagnetic reversing valve to control, which improves the flexibility of the braking control process.

2. The present disclosure can realize an on-line portable measurement on the braking idling time of each brake, and at the same time, it can perform an alarm when the abrasion of the brake shoe is excessively large, which provides a guarantee for the maintenance and safe operation of the monorail hoist brake.

3. The present disclosure compares the previous braking idling time of each brake in real time, and delays the braking control command sent to each electromagnetic reversing valve in the subsequent braking, so as to ensure that even under the working conditions of different lengths of hydraulic pipeline, different response characteristics of brakes and different abrasion states of brake shoes, the idling time of each brake in the subsequent time is basically the same, which realizes the synchronous control of multiple brakes of the monorail hoist.

4. Compared with the conventional high-precision proportional/servo valve control element, the electromagnetic reversing valve adopted in present disclosure as a control element has a stronger anti-pollution ability and a lower cost, and improves the braking control reliability of the monorail hoist.

5. The present disclosure has the advantages of simple structure, easy operation, strong adaptability, good control performance and high practicability.

BRIEF DESCRIPTION OF DRAWINGS

In order to describe the embodiments of the present disclosure or the technical solutions in the prior art more clearly, the following briefly introduces the accompanying drawings that is required to be used in the description of the embodiments or the prior art. It will be apparent that the accompanying drawings in the following description are merely some embodiments of the present disclosure. For those of ordinary skill in the art, other accompanying drawings can also be obtained according to these accompanying drawings without any creative efforts.

DESCRIPTION OF EMBODIMENTS

The following clearly and completely describes the technical solutions in embodiments of the present disclosure with reference to the accompanying drawings in the embodiments of the present disclosure. It will be apparent that the described embodiments are merely some but not all of the embodiments of the present disclosure. All other embodiments obtained by a person of ordinary skill in the art based on the embodiments of the present disclosure without creative effects shall fall within the protection scope of the present disclosure.

Figure 1:
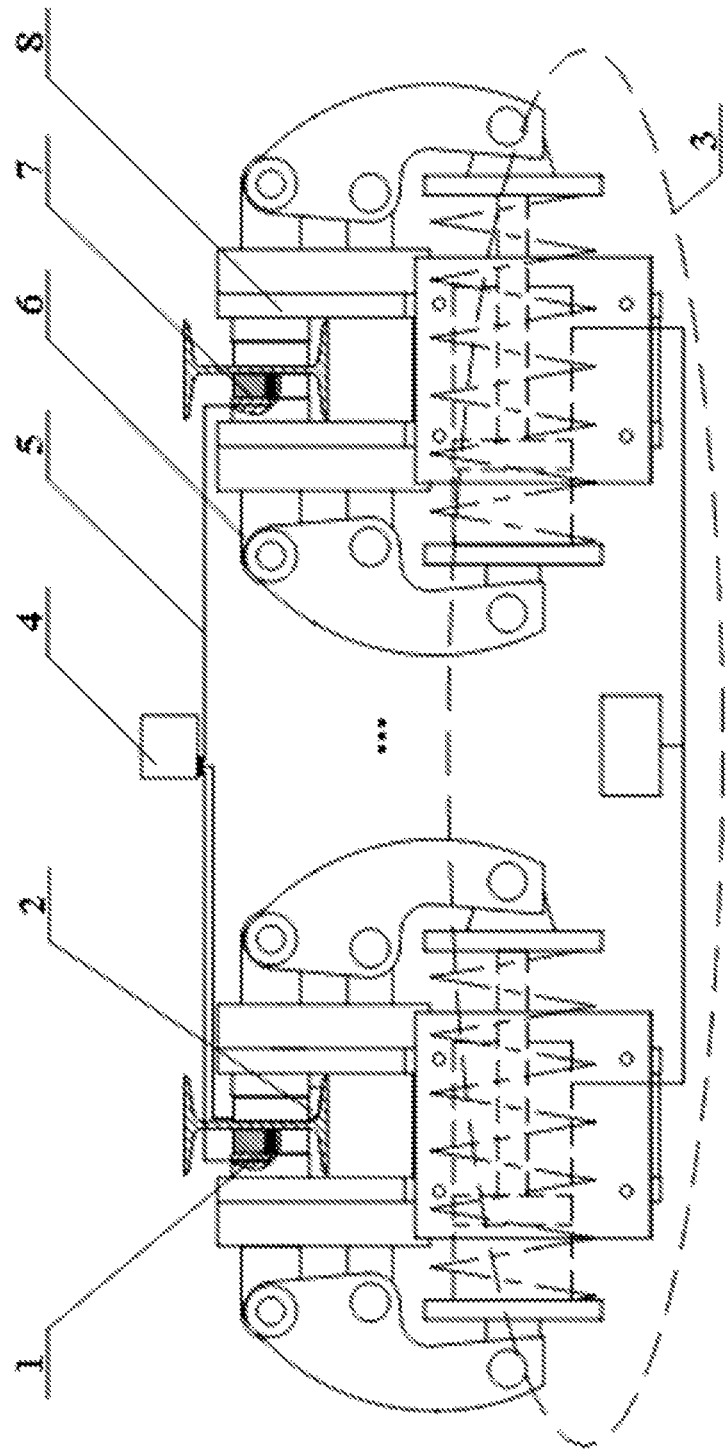
FIG. 1 illustrates a schematic diagram of a system for controlling a multi-point synchronous braking of a monorail hoist in the present disclosure.
Figure 2:
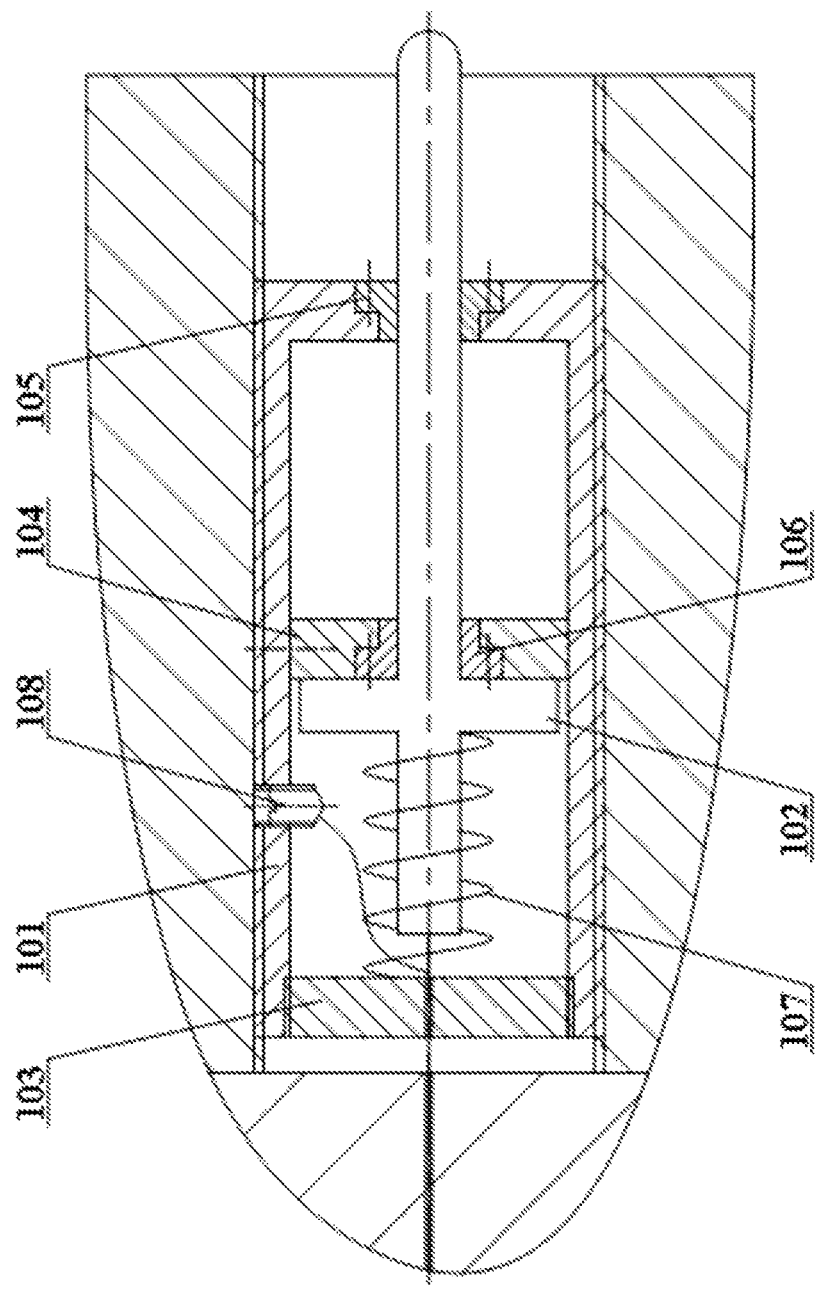
FIG. 2 illustrates an installation diagram of a structure of a contact detection unit in the present disclosure.
Figure 3:
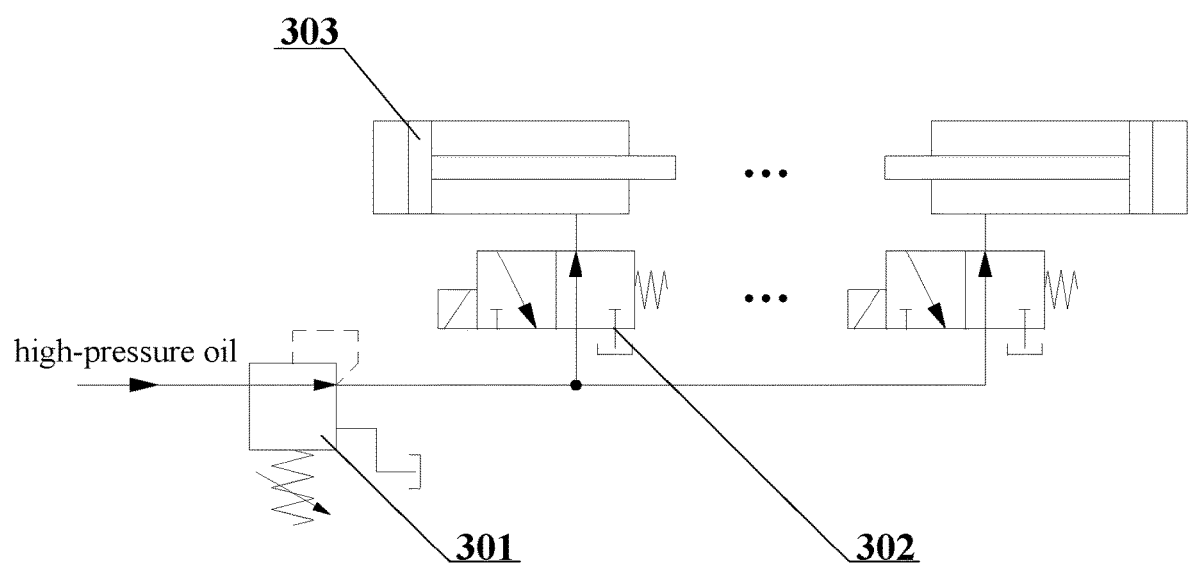
FIG. 3 illustrates a principle diagram of a hydraulic of a monorail hoist braking system in the present disclosure.
Figure 4:
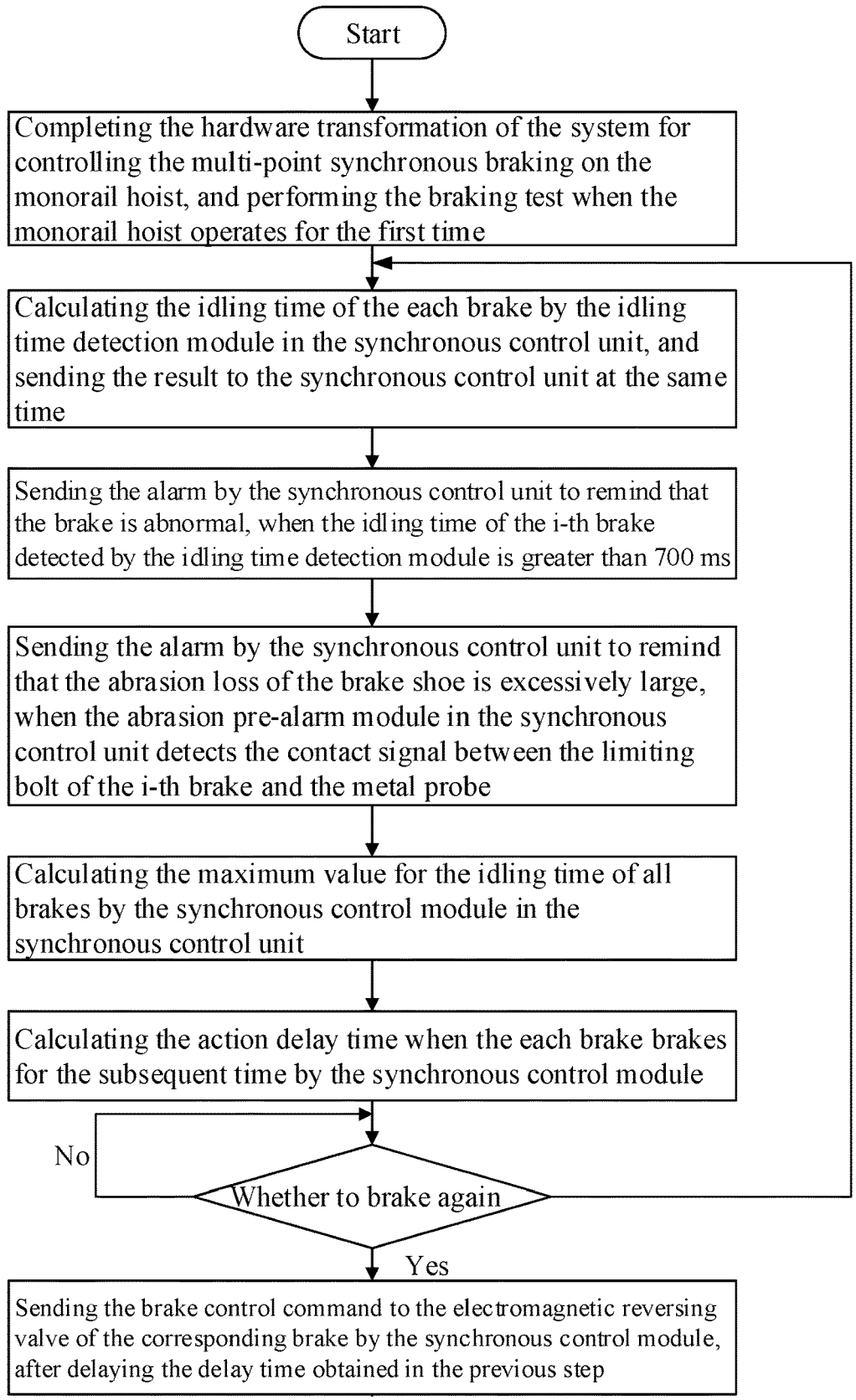
FIG. 4 illustrates a principle diagram of a method for controlling a multi-point synchronous braking of the monorail hoist in the present disclosure.

As illustrated in FIG. 1 to FIG. 4, a system for controlling a multi-point synchronous braking of a monorail hoist and a utilization method are provided in this embodiment.

The system for controlling the multi-point synchronous braking of the monorail hoist in this embodiment mainly includes a contact detection unit 1, a common end roller unit 2, a hydraulic unit 3, a synchronous control unit 4 and connection cables 5.

The contact detection unit 1 includes a tube 101, a metal probe 102, a base plate 103, a limiting ring 104, a guide ring I 105, a guide ring II 106, a preload spring 107 and a limiting bolt 108. An outer surface of the tube 101 is provide with an external thread mathedly installed with the brake shoe 7. A bottom part of the tube 101 is provided with a threaded hole. The guide ring I 105 is fixed at a center of a top part of the tube 101. A limiting bolt 108 is installed on a side of the tube 101. A limiting ring 104 is installed in a middle part of an inner wall of the tube 101. The guide ring II 106 is fixed at a center of the limiting ring 104, the base plate 103 is installed inside the threaded hole at a bottom of the tube 101. The base plate 103 is provided with a circular through-hole. A circular boss is arranged on the metal probe 102. One end of the metal probe 102 away from the limiting bolt 108 is passed through the guide ring I 105 and the guide ring II 106, and another end of the metal probe 102 approximate to the limiting bolt 108 is sleeved with the preload spring 107. The preload spring 107 is in contact with the base plate 103 and the circular boss on the metal probe 102, respectively. The circular boss of the metal probe 102 is pressed against the limiting ring 104 under an action of the preload spring 107.

The common end roller unit 2 is arrange on a travelling track, and the common end roller unit 2 is connected with the frame 8 through pin shafts.

The hydraulic unit 3 includes a pressure reducing valve 301, a two-position three-way electromagnetic reversing valve 302 and a brake cylinder 303. An oil inlet of the pressure reducing valve 301 is connected with a high-pressure oil of a hydraulic pump station. Two inlets of the two-position three-way electromagnetic reversing valve 302 are respectively in communication with an oil outlet of the pressure reducing valve 301 and an oil tank, and an outlet of the two-position three-way electromagnetic reversing valve 302 is in communication with a piston rod chamber of the brake cylinder 303.

The synchronous control unit 4 includes an idling time detection module, a synchronous control module and an abrasion pre-alarm module. The idling time detection module is connected with the metal probe 102 and the common end roller unit 2 through the connection cables 5, and the abrasion pre-alarm module is connected with the limiting bolt 108 through the connection cables 5.

One set of contact detection unit 1 is installed on each brake shoe 7 of the monorail hoist, respectively.

One two-position three-way electromagnetic reversing valve 302 is arranged on each brake cylinder 303 of the monorail hoist, respectively.

The two-position three-way electromagnetic reversing valve 302 is replaceable by a two-position four-way electromagnetic reversing valve or a three-position four-way electromagnetic reversing valve.

The materials of the tube 101 and the limiting ring 104 are nylon or polytetrafluoroethylene.

The connection cables 5 connected with the metal probe 102 and the liming bolt 108 are passed through the circular through hole on the base plate 103.

The common end roller unit 2 adopts metal conductive material.

One end of the metal probe 102 passing through the guide ring 1105 and guide ring II 106 is beyond 1 mm to 2 mm of an end face of the brake shoe 7 approximate to the travelling track.

A distance between a center line of the limiting bolt 108 and an end face of the circular boss of the metal probe 102 approximate to the limiting bolt ranges from 11 mm to 12 mm.

The installed limiting bolt 108 does not protrude from the outer surface of the tube 101.

In this embodiment, the contact detection unit 1, the common end roller unit 2, the hydraulic unit 3, the synchronous control unit 4, the connection cables 5, the brake arm 6, the brake shoe 7, the frame 8, the tube 101, the metal probe 102, the base plate 103, the limiting ring 104, the guide ring I 105, the guide ring II 106, the preload spring 107, the limiting bolt 108, the pressure reducing valve 301, the two-position three-way electromagnetic reversing valve 302 and the brake cylinder 303 adopts the existing products or structures that are well-known to those skilled in the art, and the connections between them also adopts the existing connection methods that are well-known to those skilled in the art, which are not described in detail herein.

The method for controlling the multi-point synchronous braking of the monorail hoist by utilizing the above-mentioned device comprises the following steps.

a), The hardware transformation of the system for controlling the multi-point synchronous braking is completed on the monorail hoist, and a braking test is performed when the monorail hoist operates for the first time.

b), A time $t_{i0}$ when the two-position three-way electromagnetic reversing valve 302 corresponding to the i-th brake shoe 7 receives a braking command is recorded by an idling time detection module in a synchronous control unit 4. When a metal probe 102 in a contact detection unit 1 installed on the i-th brake shoe 7 contacts the travelling track, a corresponding turn-on signal is detected by the idling time detection module and a time $t_i$ when the i-th brake signal is turned on is recorded by the idling time detection module. An idling time $\Delta t_i$ of the i-th brake shoe 7 is calculated by the idling time detection module and sent to the synchronous control unit at the same time, the calculation formula is $\Delta t_i = t_i - t_{i0}$.

c), When an idling time of the i-th brake shoe detected by the idling time detection module is $\Delta t \geq 700$ ms, an alarm is sent by the synchronous control unit 4 to remind that the brake shoe 7 is abnormal.

d), When an abrasion pre-alarm module in the synchronous control unit 4 detects a contact signal between a limiting bolt 108 corresponding to the i-th brake shoe 7 and the metal probe 102, an alarm is sent by the synchronous control unit 4 to remind that an abrasion loss of the brake shoe 7 is excessively large.

e), After the synchronous control module in the synchronous control unit 4 receives the idling time of all the brake shoes 7, the idling times of all brake shoes 7 are compared to obtain the maximum value $t_{max}$ for the idling time.

f), Action delay time $\Delta t_{idelay}$ when the i-th brake shoe (7) brakes for the subsequent time is calculated by the synchronous control module in the synchronous control unit 4, the calculation formula is $\Delta t_{idelay} = t_{max} - t_i$.

g), When the monorail hoist requires to be braked again during an operation, a brake control command is sent to a two-position three-way electromagnetic reversing valve in the i-th brake shoe 7 by the synchronous control module after delaying the time of $\Delta t_{idelay}$.

h), Step(2) to step(7) are repeated.

It will be apparent that various modifications and variations can be made by those skilled in the art in the present disclosure without departing from the spirit and scope of the present disclosure. Thus, if these modifications and variations of the present disclosure belong to the scopes of the claims of the present disclosure and their equivalents, the present disclosure is also intended to include these modifications and variations.

REFERENCE SIGNS LIST

In drawings, 1. Contact detection unit; 2. Common end roller unit; 3. Hydraulic unit; 4. Synchronous control unit; 5. Connection cable; 6. Brake arm; 7. Brake shoe; 8. Frame; 101. Tube; 102. Metal probe; 103. Base plate; 104. Limiting ring; 105. Guide ring I; 106. Guide ring II; 107. Preload spring; 108. Limiting bolt; 301. Pressure reducing valve; 302. Two-position three-way electromagnetic reversing valve; 303. Brake cylinder.

What is claimed is:

1. A system for controlling a multi-point synchronous braking of a monorail hoist, comprising a contact detection unit, a common end roller unit, a hydraulic unit, a synchronous control unit and connection cables, the contact detection unit is installed on a brake shoe of the monorail hoist, and the common end roller unit is installed on a travelling track and connected with a frame of the monorail hoist, the contact detection unit includes a tube in connection with the brake shoe, a metal probe corresponding to the travelling track is arranged inside the tube, a circular boss is formed on the metal probe, a limiting bolt corresponding to the circular boss is formed on an inner side wall of the tube, and the metal probe is contactable with the travelling track or the limiting bolt when the brake shoe brakes, the brake shoe is connected with the hydraulic unit through a brake arm, and the metal probe, the limiting bolt, the hydraulic unit, and the common end roller unit are electrically connected with the synchronous control unit through the connection cables.

2. The system for controlling the multi-point synchronous braking of the monorail hoist according to claim 1, wherein the synchronous control unit includes an idling time detection module, a synchronous control module and an abrasion pre-alarm module, the idling time detection module is connected with the metal probe and the common end roller unit through the connection cables, the abrasion pre-alarm module is connected with the limiting bolt through the connection cables, and the synchronous control module is electrically connected with the idling time detection module, the abrasion pre-alarm module and the hydraulic unit.

3. The system for controlling the multi-point synchronous braking of the monorail hoist according to claim 1, wherein the hydraulic unit includes a pressure reducing valve, a two-position three-way electromagnetic reversing valve and a brake cylinder, an oil inlet of the pressure reducing valve is connected with a high-pressure oil pipe of a hydraulic pump station, two oil inlets of the two-position three-way electromagnetic reversing valve are respectively in communication with an oil outlet of the pressure reducing valve and an oil tank, an oil outlet of the two-position three-way electromagnetic reversing valve is in communication with a piston rod chamber of the brake cylinder, and a telescopic rod of the brake cylinder is connected with a brake arm.

4. The system for controlling the multi-point synchronous braking of the monorail hoist according to claim 3, wherein the two-position three-way electromagnetic reversing valve is replaceable by a two-position four-way electromagnetic reversing valve or a three-position four-way electromagnetic reversing valve.

5. The system for controlling the multi-point synchronous braking of the monorail hoist according to claim 1, wherein the contact detection unit further includes the metal probe, a base plate, a limiting ring, a guide ring I, a guide ring II and a preload spring, the tube is threadedly connected with the brake shoe, a bottom part of the tube is provided with a threaded hole, the guide ring I is fixed on a top of the tube, the limiting bolt is installed on an inner side of the tube, the limiting ring is installed on an inner wall of the tube, and the guide ring II is installed inside the limiting ring; the base plate is installed inside the threaded hole at a bottom of the tube, the base plate is provided with a circular through-hole; one end of the metal probe away from the limiting bolt is passed through the guide ring I and the guide ring II in sequence and is protruded outside the brake shoe to correspond to the travelling track, and another end of the metal probe approximate to the limiting bolt is sleeved with the preload spring, the preload spring is abutted against the base plate and the circular boss on the metal probe, and the circular boss of the metal probe is pressed against the limiting ring under an action of the preload spring.

6. The system for controlling the multi-point synchronous braking of the monorail hoist according to claim 5, wherein the tube and the limiting ring are made of nylon or polytetrafluoroethylene.

7. The system for controlling the multi-point synchronous braking of the monorail hoist according to claim 5, wherein a distance between a center line of the limiting bolt and an end face of the circular boss of the metal probe approximated to the limiting bolt ranges from 11 mm to 12 mm.

8. The system for controlling the multi-point synchronous braking of the monorail hoist according to claim 5, wherein a length of the metal probe protruding outside an end face of the brake shoe approximate to the travelling track ranges from 1 mm to 2 mm.

9. The system for controlling the multi-point synchronous braking of the monorail hoist according to claim 1, wherein the common end roller unit is made of a metal conductive material.

10. A method for utilizing the system for controlling the multi-point synchronous braking of the monorail hoist according to claim 1, comprising following steps:

(1) installing the system for controlling the multi-point synchronous braking of the monorail hoist on the monorail hoist, and performing, when the monorail hoist operates for a first time, a braking test;

(2) recording, by the idling time detection module in the synchronous control unit, a time $t_{i0}$ when the two-position three-way electromagnetic reversing valve corresponding to an i-th brake shoe receives a braking command; detecting, by the idling time detection module, a corresponding turn-on signal when the metal probe in the contact detection unit installed on the i-th brake shoe contacts the travelling track, and recording a time ti when an i-th brake signal is turned on; calculating, by the idling time detection module, idling time $\Delta t_i$ of the i-th brake shoe and sending the idling time to the synchronous control unit at the same time, wherein a calculation formula is $\Delta t_i = t_i - t_{i0}$;

(3) sending, by the synchronous control unit, an alarm to remind that the brake shoe is abnormal, when the idling time of the i-th brake shoe detected by the idling time detection module is $\Delta t \geq 700$ ms;

(4) sending, by the synchronous control unit, an alarm to remind that an abrasion loss of the brake shoe is excessively large, when the abrasion pre-alarm module in the synchronous control unit detects a contact signal between the limiting bolt corresponding to the i-th brake shoe and the metal probe;
(5) comparing the idling time of all brake shoes to obtain a maximum value $t_{max}$ for the idling time, after the synchronous control module in the synchronous control unit receives the idling time of all brake shoes;
(6) calculating, by the synchronous control module in the synchronous control unit, action delay time $\Delta t_{idelay}$ when the i-th brake shoe brakes for a subsequent time, wherein a calculation formula is $\Delta t_{idelay} = t_{max} - t_i$;
(7) sending, by the synchronous control module, a brake control command to the two-position three-way electromagnetic reversing valve in the i-th brake shoe after delaying the time of $\Delta t_{idelay}$ when the monorail hoist requires to be braked again during the operation; and
(8) repeating step (2) to step (7).

* * * * *